United States Patent
Morganson et al.

(10) Patent No.: US 11,318,676 B2
(45) Date of Patent: May 3, 2022

(54) POWDER EVACUATION SYSTEMS

(71) Applicant: Hamilton Sundstrand Corporation, Charlotte, NC (US)

(72) Inventors: David W. Morganson, East Hartford, CT (US); Lawrence Binek, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 526 days.

(21) Appl. No.: 16/166,911

(22) Filed: Oct. 22, 2018

(65) Prior Publication Data
US 2020/0122396 A1 Apr. 23, 2020

(51) Int. Cl.
| | |
|---|---|
| *B29C 64/35* | (2017.01) |
| *B33Y 10/00* | (2015.01) |
| *B33Y 30/00* | (2015.01) |
| *B33Y 40/00* | (2020.01) |
| *B33Y 50/02* | (2015.01) |
| *B29C 64/364* | (2017.01) |
| *B29C 64/153* | (2017.01) |
| *B29C 64/393* | (2017.01) |

(52) U.S. Cl.
CPC ............ *B29C 64/35* (2017.08); *B29C 64/153* (2017.08); *B29C 64/364* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ..... B29C 64/35; B29C 64/364; B29C 64/153; B29C 64/393; B33Y 10/00; B33Y 30/00; B33Y 40/00; B33Y 50/02
USPC .......................................................... 264/497
See application file for complete search history.

(56) References Cited

U.S. PATENT DOCUMENTS

| | | | |
|---|---|---|---|
| 2004/0084814 A1* | 5/2004 | Boyd .................... | B33Y 40/00 264/497 |
| 2006/0214335 A1* | 9/2006 | Cox ......................... | B01F 5/10 264/497 |
| 2016/0318253 A1* | 11/2016 | Barnhart ............... | B29C 64/153 |
| 2017/0036401 A1 | 2/2017 | Donovan et al. | |
| 2017/0165792 A1* | 6/2017 | Buller .................. | B23K 26/144 |
| 2017/0232670 A1* | 8/2017 | Joerger .................. | B22F 10/60 264/497 |
| 2018/0236504 A1 | 8/2018 | Pourcher et al. | |

FOREIGN PATENT DOCUMENTS

| | | |
|---|---|---|
| EP | 1316408 A1 | 6/2003 |
| WO | 2017/121995 A1 | 7/2017 |

* cited by examiner

*Primary Examiner* — Matthew J Daniels
*Assistant Examiner* — Gregory C. Grosso
(74) *Attorney, Agent, or Firm* — Locke Lord LLP; Joshua L. Jones; Scott D. Wofsy

(57) ABSTRACT

An additive manufacturing system includes a build chamber housing a recoater and a sintering laser. A build plate is moveable within the build chamber to accommodate growth of a part formed by the recoater and the sintering laser. At least one powder evacuation cavity at least partially surrounds a build volume of the build chamber. The build volume of the build chamber is defined between the build plate and the recoater and is configured to hold a sintered part and unsintered powder during an additive manufacturing build in the build chamber.

8 Claims, 3 Drawing Sheets

POWDER EVACUATION SYSTEMS

BACKGROUND OF THE INVENTION

1. Field of the Invention

The present disclosure relates to additive manufacturing, and more particularly to management of stock powder such as used in laser sintering for additive manufacturing.

2. Description of Related Art

Powder evacuation and removal at the end of an additive manufacturing build is a highly manual operation in conventional additive manufacturing systems. This powder removal is non-standardized and the quality of the procedure is a function of the operator's diligence.

The conventional techniques have been considered satisfactory for their intended purpose. However, there is an ever present need for improved feedstock powder management. This disclosure provides a solution for this need.

SUMMARY OF THE INVENTION

An additive manufacturing system includes a build chamber housing a recoater and a sintering laser. A build plate is moveable within the build chamber to accommodate growth of a part formed by the recoater and the sintering laser. At least one powder evacuation cavity at least partially surrounds a build volume of the build chamber. The build volume of the build chamber is defined between the build plate and the recoater and is configured to hold a sintered part and unsintered powder during an additive manufacturing build in the build chamber.

The at least one powder evacuation cavity can be selectively in fluid communication with the build volume through at least one gating valve. An oscillation transducer can be operatively connected to the build volume to vibrate the build volume sub- or ultrasonically to facilitate flow of powder from the build volume into the at least one powder evacuation cavity. The oscillation transducer can be configured to vibrate in a direction lateral to the build direction in the build volume. The at least one evacuation cavity can include a single evacuation cavity that surrounds the build volume peripherally.

A dosing chamber can be operatively connected to supply feedstock powder to the build volume. The dosing chamber and the at least one powder evacuation cavity can be distinct and separate from one another. The at least one powder evacuation cavity and the dosing chamber can be operatively connected to one another by a recycling system configured to recycle used feedstock powder from the at least one powder evacuation cavity through a recycling process for re-use in the dosing chamber. The build chamber, the at least one evacuation cavity, the recycling system, and the dosing chamber can all be part of a controlled atmosphere closed loop.

A controller can be operatively connected to the build plate, the recoater, and the sintering laser to control additive manufacture of a part in the build volume. The controller can be operatively connected to the at least one evacuation cavity to automatically initiate powder removal from the build volume after completing a build.

A method of managing feedstock powder includes forming a part from feedstock powder in a powder bed within a build volume. The method includes evacuating unsintered feedstock powder from the build volume (e.g. after forming the part), wherein the unsintered feedstock powder flows into at least one evacuation cavity at least partially surrounding the build volume.

Evacuating unsintered feedstock powder can include opening at least one gating valve to place the at least one powder evacuation cavity in fluid communication with the build volume. Evacuating unsintered feedstock powder can include vibrating the build volume sub- or ultrasonically to facilitate flow of powder from the build volume into the at least one powder evacuation cavity. Vibrating the build volume can include vibrating the build volume in a direction lateral to build direction in the build volume. The method can include dosing feedstock powder into the build volume from a dosing chamber, wherein the dosing chamber and the at least one powder evacuation cavity are distinct and separate from one another. The method can include recycling feedstock powder from the at least one evacuation cavity to the dosing chamber through a closed loop recycling system for re-use of the unsintered feedstock powder. Recycling the feedstock powder can include maintaining the closed loop recycling system under a controlled atmosphere. The method can include automatically controlling the at least one evacuation cavity to automatically initiate powder removal from the build volume after completing a build.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
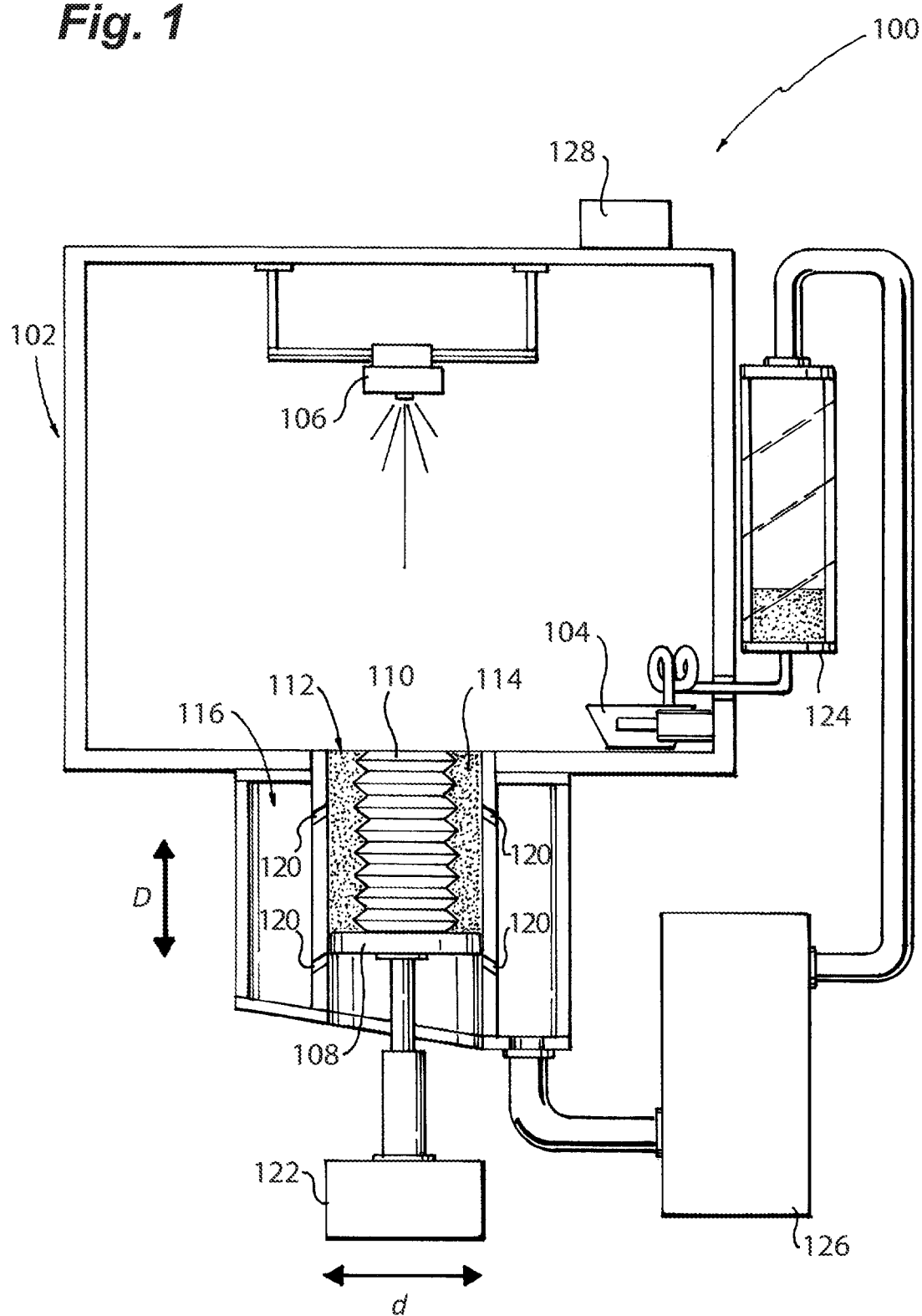
FIG. 1 is a schematic side elevation view of an exemplary embodiment of an additive manufacturing system constructed in accordance with the present disclosure, showing a part being sintered from feedstock powder in the build volume.

Reference will now be made to the drawings wherein like reference numerals identify similar structural features or aspects of the subject disclosure. For purposes of explanation and illustration, and not limitation, a partial view of an exemplary embodiment of an additive manufacturing system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to improve handling of feedstock powder, and particularly to improve automation of removal of feedstock powder from a build chamber after a build.

The system 100 includes a build chamber 102 housing a recoater 104 and a sintering laser 106. A build plate 108 is moveable within the build chamber 102 to accommodate growth of a part 110 formed by the recoater 104 and the sintering laser 106. At each stage during the build, the recoater 104 deposits a thin layer of feedstock powder in the build volume 112, and the sintering laser selectively sinters a portion of the thin layer of feedstock powder 114 onto the part 110. As each new layer is sintered, the part 110 grows in a build direction D, i.e., vertically as oriented in FIGS. 1-2, as the unsintered feedstock powder 114 accumulates around the part 110 in the build volume 112. The build volume 112 of the build chamber 112 is defined between, i.e. vertically between as oriented in FIG. 1, the build plate 108 and the recoater 104 and is configured to hold a sintered part 110 and unsintered feedstock powder 114 during an additive manufacturing build in the build chamber 102.

Figure 3:
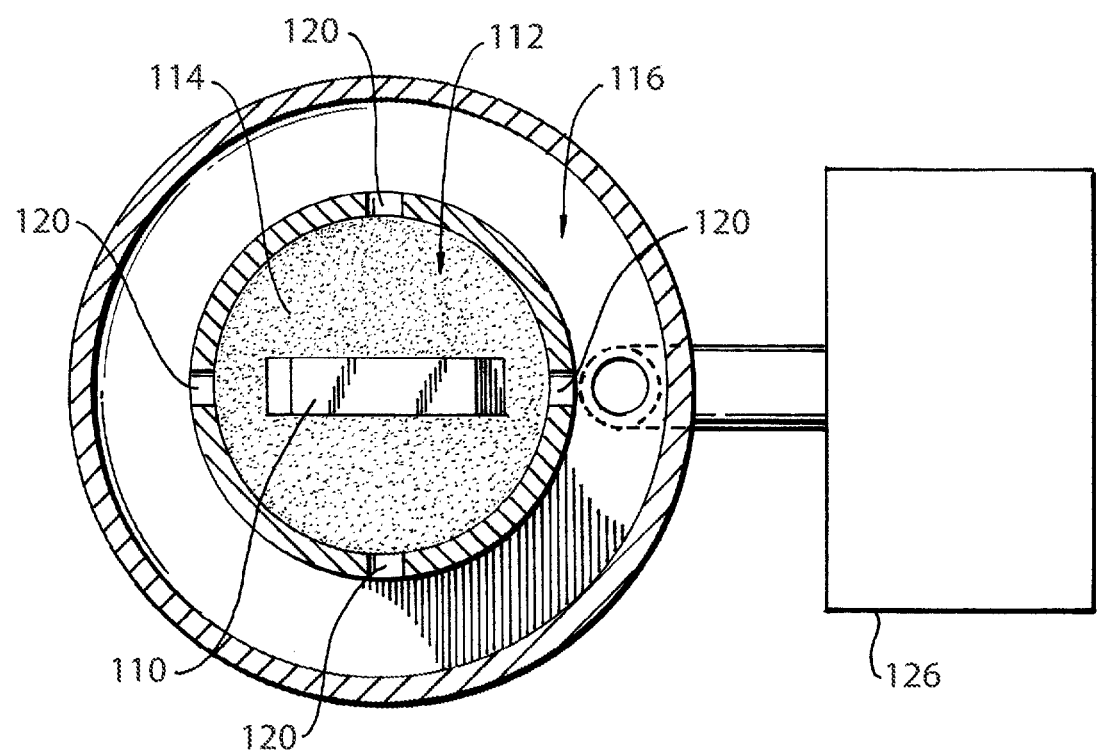
FIG. 3 is a schematic plan view of the build volume and evacuation cavity of FIG. 1.

At least one powder evacuation cavity 116 at least partially surrounds the build volume 112 of the build chamber 102. As shown in FIG. 3, there is one evacuation cavity 112 that completely surrounds the build volume 112 peripherally, however those skilled in the art will readily appreciate that any suitable number of evacuation cavities can be arranged at least partially around the periphery of the build volume 112 without departing from the scope of this disclosure.

The powder evacuation cavity 116 is selectively in fluid communication with the build volume 112 through a plurality of gating valves 120. An oscillation transducer 122 is operatively connected to the build volume 112 to vibrate the build volume 112 sub- or ultrasonically to facilitate flow of unsintered feedstock powder 114 from the build volume 112, through the gating valves 120 into the at least one powder evacuation cavity 120. The oscillation transducer can be incorporated in the actuator for moving the build plate 108 in the build direction D, for example, and is configured to vibrate in a direction d that is lateral to the build direction D in the build volume 112.

Figure 2:
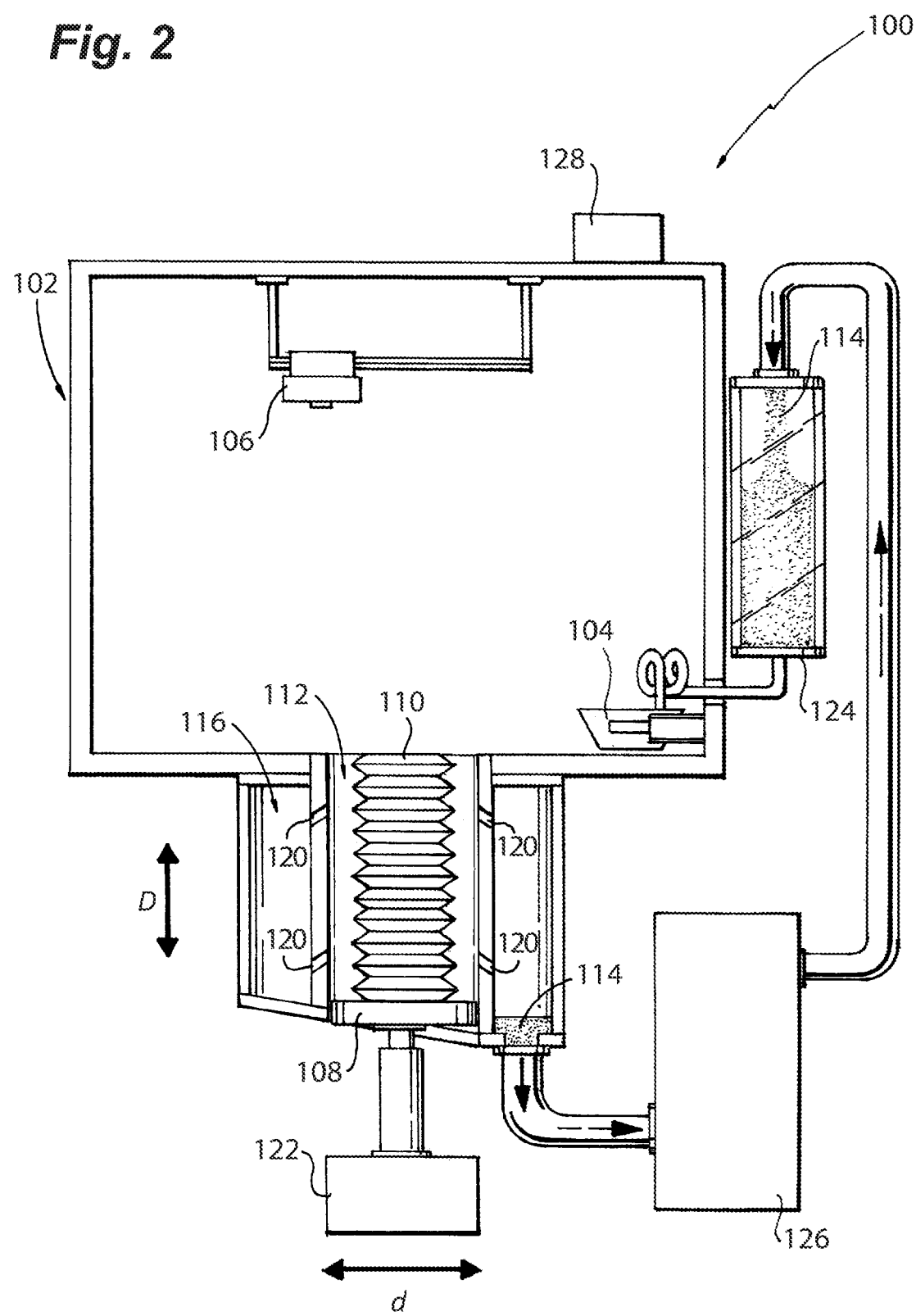
FIG. 2 is a schematic side elevation view of the system of FIG. 1, showing feedstock powder evacuated through the evacuation cavity, recycled, and returned to the dosing chamber for use in another build.

A dosing chamber 124 is operatively connected to supply feedstock powder 114 to the build volume 112. The dosing chamber 124 and the powder evacuation cavity 116 are distinct and separate chambers from one another. The powder evacuation cavity 112 and the dosing chamber 124 are operatively connected to one another by a recycling system 126 configured to recycle used feedstock powder 114 from the powder evacuation cavity 116 through a recycling process, e.g., including filtering and straining, for re-use in the dosing chamber 124 for building a subsequent part 110. The build chamber 102, the evacuation cavity 116, the recycling system 126, and the dosing chamber 124 can all be part of a controlled atmosphere closed loop so that the feedstock powder 114 can be isolated from the ambient atmosphere. FIG. 1 shows the feedstock powder 114 that is unsintered in the build chamber 112 during a build of the part 110, and FIG. 2 shows the recycled feedstock powder 114 returned to the dosing chamber 124 after evacuation from the build volume 112 through the powder evacuation cavity 116 for use in a subsequent build.

A controller 128 is operatively connected to the build plate 108, the recoater 104, and the sintering laser 106 to control additive manufacture of a part 110 in the build volume 112. The controller 128 is operatively connected to the evacuation cavity 112 to automatically initiate powder removal, e.g., by opening the gating valves 120, from the build volume 112 after completing a build. It is also contemplated that the build plate 108 can provide the gating, e.g., wherein the gating valves 120 are simply ports connecting between the build volume 112 and the evacuation cavity 110 that are positioned so that the controller 128 can cause over-traveling of the build plate 108 below the ports to open the pathway from the build volume 112 to the evacuation cavity 110.

A method of managing feedstock powder includes forming a part, e.g., part 110, from feedstock powder, e.g., feedstock powder 114, in a powder bed within a build volume, e.g., build volume 112. The method includes evacuating unsintered feedstock powder from the build volume after forming the part, wherein the unsintered feedstock powder flows into at least one evacuation cavity, e.g., evacuation cavity 116, at least partially surrounding the build volume.

Evacuating unsintered feedstock powder can include opening at least one gating valve, e.g., gating valves 120, to place the at least one powder evacuation cavity in fluid communication with the build volume. The method can include dosing feedstock powder into the build volume from a dosing chamber, e.g., dosing chamber 124, wherein the dosing chamber and the at least one powder evacuation cavity are distinct and separate from one another. The method can include recycling feedstock powder from the at least one evacuation cavity to the dosing chamber through a closed loop recycling system, e.g., recycling system 126, for re-use of the unsintered feedstock powder. Recycling the feedstock powder can optionally include maintaining the closed loop recycling system under a controlled atmosphere. The method can include automatically controlling the at least one evacuation cavity to automatically initiate powder removal from the build volume after completing a build.

A powder evacuation system as disclosed herein can remove feedstock powder from the build chamber by agitating the un-sintered powder feedstock using sub- to ultrasonic frequencies. Once the part build has completed, the oscillation transducer engages causing the static feedstock powder in the build volume to flow into one or more evacuation cavities that are located around the build plate platform in its most retracted state, i.e. its lowest position as oriented in FIGS. 1 and 2. The feedstock powder that has been evacuated in this manner can be collected and reprocessed in existing closed-loop powder circuits.

This process removes considerable lead time in post processing after a build. Powder removal in conventional systems is a highly manual operation which is not standardized or quality controlled. By having a reliable automated process for powder extraction, such as disclosed herein, post processing efforts are reduced and better controlled. Operators can be spared from exposure to free powder and the powder that has been evacuated from the build can be easily reintroduced into the feedstock supply without risking contamination.

The methods and systems of the present disclosure, as described above and shown in the drawings, provide for feedstock powder management with superior properties including automatic removal of unsintered feedstock powder, and facilitated recycling of the feedstock powder. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An additive manufacturing system comprising:
a build chamber housing a recoater and a sintering laser;

a build plate that is moveable along a build direction within the build chamber to accommodate growth of a part formed by the recoater and the sintering laser; and at least one powder evacuation cavity at least partially surrounding a build volume of the build chamber peripherally around the build plate relative to the build direction, wherein the build volume of the build chamber is defined between the build plate and the recoater in the build direction and is configured to hold a sintered part and unsintered powder during an additive manufacturing build in the build chamber, wherein the at least one powder evacuation cavity is selectively in fluid communication with the build volume through at least one gating valve.

2. An additive manufacturing system comprising:

a build chamber housing a recoater and a sintering laser;

a build plate that is moveable along a build direction within the build chamber to accommodate growth of a part formed by the recoater and the sintering laser; and at least one powder evacuation cavity at least partially surrounding a build volume of the build chamber peripherally around the build plate relative to the build direction, wherein the build volume of the build chamber is defined between the build plate and the recoater in the build direction and is configured to hold a sintered part and unsintered powder during an additive manufacturing build in the build chamber, further comprising an oscillation transducer operatively connected to the build volume to vibrate the build volume to facilitate flow of powder from the build volume into the at least one powder evacuation cavity.

3. The system as recited in claim 2, wherein at least one of:

the oscillation transducer is configured to vibrate in a direction lateral to build direction in the build volume; and/or the oscillation transducer is configured to vibrate the build volume sub- or ultrasonically.

4. The system as recited in claim 1, further comprising a dosing chamber operatively connected to supply feedstock powder to the build volume, wherein the dosing chamber and the at least one powder evacuation cavity are distinct and separate from one another.

5. The system as recited in claim 4, wherein the at least one powder evacuation cavity and the dosing chamber are operatively connected to one another by a recycling system configured to recycle used feedstock powder from the at least one powder evacuation cavity through a recycling process for re-use in the dosing chamber.

6. The system as recited in claim 5, wherein the build chamber, the at least one evacuation cavity, the recycling system, and the dosing chamber are all part of a controlled atmosphere closed loop.

7. An additive manufacturing system comprising:

a build chamber housing a recoater and a sintering laser;

a build plate that is moveable along a build direction within the build chamber to accommodate growth of a part formed by the recoater and the sintering laser; and at least one powder evacuation cavity at least partially surrounding a build volume of the build chamber peripherally around the build plate relative to the build direction, wherein the build volume of the build chamber is defined between the build plate and the recoater in the build direction and is configured to hold a sintered part and unsintered powder during an additive manufacturing build in the build chamber, wherein the at least one evacuation cavity consists of a single evacuation cavity that surrounds the build volume peripherally.

8. An additive manufacturing system comprising:

a build chamber housing a recoater and a sintering laser;

a build plate that is moveable along a build direction within the build chamber to accommodate growth of a part formed by the recoater and the sintering laser;

at least one powder evacuation cavity at least partially surrounding a build volume of the build chamber peripherally around the build plate relative to the build direction, wherein the build volume of the build chamber is defined between the build plate and the recoater in the build direction and is configured to hold a sintered part and unsintered powder during an additive manufacturing build in the build chamber; and a controller operatively connected to the build plate, the recoater, and the sintering laser to control additive manufacture of a part in the build volume, wherein the controller is operatively connected to the at least one evacuation cavity to automatically initiate powder removal from the build volume after completing a build.

* * * * *